(12) United States Patent
Kimura

(10) Patent No.: US 6,798,469 B2
(45) Date of Patent: Sep. 28, 2004

(54) OPTICAL ELEMENT, OPTICAL LIGHT SOURCE UNIT AND OPTICAL DISPLAY DEVICE EQUIPPED WITH THE OPTICAL LIGHT SOURCE UNIT

(75) Inventor: Koichi Kimura, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 359 days.

(21) Appl. No.: 09/881,095

(22) Filed: Jun. 15, 2001

(65) Prior Publication Data

US 2001/0055208 A1 Dec. 27, 2001

(30) Foreign Application Priority Data

Jun. 15, 2000 (JP) ........................................ 2000-179892

(51) Int. Cl.[7] ............................................. G02F 1/1335
(52) U.S. Cl. ............................................. 349/61; 362/31
(58) Field of Search ............................... 349/61; 362/31

(56) References Cited

U.S. PATENT DOCUMENTS 4,274,028 A * 6/1981 Frame ........................ 313/530
4,822,144 A * 4/1989 Vriens ......................... 349/71
6,210,012 B1 * 4/2001 Broer .......................... 362/84
6,307,604 B1 * 10/2001 Hikmet et al. ................ 349/71

FOREIGN PATENT DOCUMENTS

| JP | 07-036025 | 2/1995 |
|---|---|---|
| JP | 09-159994 | 6/1997 |
| JP | 11-024052 | 1/1999 |

OTHER PUBLICATIONS

Klein. "International Display Research Conference," Sep. 15–19, 1997, Toronto Canada, pp. 258–261.

* cited by examiner

Primary Examiner—Tarifur R. Chowdhury
Assistant Examiner—P. R. Akkapeddi
(74) Attorney, Agent, or Firm—Young & Thompson

(57) ABSTRACT

An optical element comprises a fluorescence luminous element that emits fluorescent light when excited and a cholesteric filter disposed at the incident side of the fluorescence luminous element at which excitation light enters the fluorescence luminous element. The cholesteric filter comprises a cholesteric layer operative to transmit the excitation light and to reflect backward scattered fluorescent light traveling thereto so as to be integrated with fluorescent light directly coming out of the cholesteric filter.

21 Claims, 11 Drawing Sheets

OPTICAL ELEMENT, OPTICAL LIGHT SOURCE UNIT AND OPTICAL DISPLAY DEVICE EQUIPPED WITH THE OPTICAL LIGHT SOURCE UNIT

BACKGROUND OF THE INVENTION

1. Field of the Invention

The present invention relates to an optical luminescent element that is used together with an excitation light source such as a fluorescent lamp, and, more particularly, to an optical display device equipped with the optical luminous element which provides fluorescent light with controlled excitation fight.

2. Description of the Related Art

In the prior art optical device operative to absorb excitation light and to admit fluorescent light to come out thereof, a filter operative to transmit ultra-violet light and reflects fluorescent light has not been incorporated in a fluorescent lamp that emits fluorescent light when a fluorescent substance is excited by ultra-violet excitation light or a general light source system which causes a fluorescence luminous element to absorb excitation light other than ultra-violet light and to emit fluorescent light. In consequence, the optical element that is made so as to absorb fluorescent light traveling toward an excitation light source raises a decline in the output efficiency of fluorescent light.

In order to improve the output efficiency of fluorescent light from the fluorescence luminous element there have been proposed optical display devices equipped with a filter function in, for example, Japanese Unexamined Patent Publications Nos. 63-172120 and 9-159994.

Before describing the present invention in detail, reference is made to FIGS. 18 and 19 for the purpose of providing a brief background in connection with a prior art optical display device that will enhance understanding of the optical element and the optical display device equipped with the optical element of the present invention.

As schematically shown in FIG. 18, the optical display device 100A described in Japanese Unexamined Patent Publication No. 63-172120 comprises an ultra-violet light source 110a, a liquid crystal shutter 102, an interference filter 114 and fluorescence luminous elements 108a provided for three primary colors, red, green and blue, on the interference filter 114, which are arranged in this order. The interference filter 114 comprises a multi-layer (more than 20 layers) dielectric thin film that has an alternate structure of high refractivity dielectric layers and low refractivity dielectric layers or a multi-layer thin film that has an alternate structure of metal layers and dielectric layers. Such an interference filter 114 transmits ultra-violet rays L as excitation light for exciting the fluorescence luminous elements 108a and absorbs fluorescent rays M emanating backward from the fluorescence luminous elements 108a The interference filter 114 improves the resolusion and contrast of the optical display device 100A.

Further, as schematically shown in FIG. 19, the optical display device 100B described in Japanese Unexamined Patent Publication No. 9-159994 comprises an ultra-violet light source 110b, deflection plates 120 and 124 disposed on opposite sides of a liquid crystal light modulator 123, a reflection mirror 126 operative to reflect visible light M and fluorescence luminous elements 108b provided for three primary colors, red, green and blue, on the visible light reflection plate 126, which are arranged in this order. The visible light reflection mirror 126 comprises a multi-layer dielectric thin film like the interference filter 114 of the optical display device shown in FIG. 18 and operates to transmit ultra-violet rays L and to reflect forward scattered fluorescent rays M from the fluorescence luminous elements 108b.

These prior art optical display devices described above by way of example increase the utilization efficiency of fluorescent light by reflecting the scattered fluorescent rays M traveling backward from the fluorescence luminous elements 108a or 108b by a multi-layer dielectric thin film, namely the interference filter 114 or the visible light reflection mirror 126. However, because the multi-layer dielectric thin film is formed by vacuum evaporation, in order for the multilayer dielectric thin-film to be capable of reflecting almost 100% of visible light incident thereupon, the multi-layer dielectric thin-film necessitates ordinarily consisting of several tens of layers. This results in high production costs of the optical display device.

SUMMARY OF THE INVENTION

It is therefore an object of the present invention to provide an optical element that is used together with a fluorescent light source and an optical display device that makes a display.

It is another object of the present invention to provide an optical element which employs an inexpensive filter other than an optical filter consisting of a multi-layer dielectric thin-film which is expensive.

It is still another object of the present invention to provide an optical element having a high utilization efficiency of excitation energy.

The foregoing objects of the present invention are accomplished by an optical element comprises a fluorescence luminous element operative to emit fluorescent light when excited by excitation light and a cholesteric filter comprising a cholesteric liquid crystal layer. The cholesteric liquid crystal layer as the cholesteric filter is formed over the fluorescence luminous element at one side of the fluorescence luminous element at which the excitation rays enter the fluorescence luminous element so as to transmit at least partly the excitation rays and to reflect at least partly the fluorescent rays traveling to the cholesteric filter.

The optical element transmits either right- or left-handed circularly polarized component of excitation light that is coincident in twist direction with a spiral structure of the cholesteric liquid crystal layer as the cholesteric filter and reflects a circularly polarized component of scattered fluorescent rays traveling to the cholesteric liquid crystal layer that is coincident in twist direction with the spiral structure of the cholesteric liquid crystal layer. In consequence, the optical element integrates the scattered fluorescent rays traveling backward to the cholesteric liquid crystal layer with the fluorescent rays directly coming out of the fluorescence luminous element, so as thereby to provide an increase in the utilization efficiency of fluorescent light.

The cholesteric filter may comprise two cholesteric liquid crystal layers having spiral structures opposite in twist direction, respectively, which are formed one on top of the other. This cholesteric filter can reflect both right- and left-handed circularly polarized components of scattered fluorescent rays.

The cholesteric filter may comprise a half wave plate element and two cholesteric liquid crystal layers having the same directional spiral structure between which the half wave plate is disposed. Because the half wave plate element reverses a circularly polarize component of excitation rays, the cholesteric filter reflects both right- and left-handed circularly polarized components of scattered fluorescent rays.

The cholesteric filter may further comprise a plurality of cholesteric liquid crystal layers operative to reflect visible light having wavelengths different from one another, specifically red, green and blue light, that are formed one on top of another. The optical element equipped with this type of cholesteric filter can reflect the entire range of visible light.

The optical element may comprise such a fluorescence luminance element as to emit visible fluorescent light or infrared light when excited by ultra-violet excitation light. In the case where the fluorescence luminance element is of a type which emits red, green and blue fluorescent light when excited by ultra-violet excitation light, the cholesteric filter is adapted so as to admit the ultra-violet excitation light to pass through and to reflect red, green and blue fluorescent light.

When the optical element is used to make a fulfill color display, the fluorescence luminance element is of a type which emits red and/or green fluorescent light when excited by blue excitation light. In this case, the cholesteric filter is adapted as to reflect red and/or green fluorescent rays traveling to the cholesteric filter and to transmit the blue excitation light The optical element thus structured can make a high brightness full color display.

The optical element may be united with a light source operative to emit excitation light such as a discharge lamp, an electro luminescence element and an electron-ray radiating element.

Further, the optical element can also be united with a light modulating element operative to modulate the fluorescent rays emanating from the fluorescence luminous element or excitation light from an excitation light source, such as a discharge lamp, an electro luminescence element and an electron-ray radiating element. When the optical element is incorporated in an optical display device, the scattered fluorescent rays traveling to and reflected by the cholesteric filter are modulated by the light modulating element. In consequence, the optical display device can convert the entire energy of excitation light into display light, which makes a display bright. The light modulating element may be disposed between the optical element and the excitation light source so as to modulate the excitation light from the excitation light source. This arrangement excites the fluorescence luminous element by excitation light after optical modulation, so as to cause the fluorescence luminous element to emit diffused fluorescent rays. In consequence, the optical display device can make a wide view angle of display without incorporating a diffusion element. In addition, because the cholesteric filter reflects scattered fluorescent rays traveling thereto, the optical display device provides an increase in the utilization efficiency of fluorescent rays. This is a contributory cause of a bright display.

The light modulating element may comprise any one of a liquid crystal element, an electromechanical light modulating element operative to modulate light due to electromechanical action and an electro-optical crystal. The electromechanical light modulating element may be of a type which changes a transmissible area that transmits light so as to control transmittance thereof or of a type which changes an optical length for interference so as to control transmittance thereof. The latter type of electromechanical light modulating element performs light modulation by changing an optical length for interference due to deformation of a flexible thin film, so as thereby to modulate near ultra-violet excitation rays for exciting the fluorescence luminous element. Further, electromechanical light modulating element may be of a type which performs total reflection of excitation rays incident thereupon at angles greater than a critical angle and admits proximity excitation rays (excitation rays that are affected by proximity effect) incident thereupon to pass through so as thereby to control transmittance thereof. This type of electromechanical light modulating element can perform high speed light modulation at a low driving voltage. In consequence, the electromechanical light modulating element is superior in the ability of displaying a moving object to the liquid crystal type of light modulator. Further, this electromechanical light modulating element provides an increase in the utilization efficiency of fluorescent light due to reflection of scattered fluorescent rays by the cholesteric filter. This causes the optical display device make a bright and high grade display.

BRIEF DESCRIPTION OF THE DRAWINGS

The above and other objects and features of the present invention will be clearly understood from the following description with respect to the preferred embodiment thereof when considered in conjunction with the accompanying drawings, wherein the same reference numerals have been used to denote the same or similar parts or elements, and in which:

FIG. 17 is a schematic cross-sectional view of the electromechanical light modulating element in an excitation light transmitting state in which the electromechanical light modulating element permits proximity excitation rays to pass through;

DETAILED DESCRIPTION OF THE PREFERRED EMBODIMENTS

Figure 1:
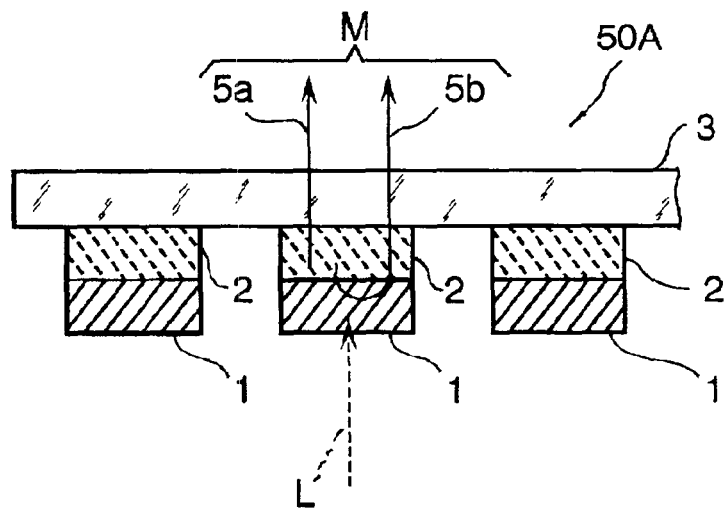
FIG. 1 is a partial cross-sectional view of an optical element in accordance with a preferred embodiment of the present invention.

Referring to the drawings in detail, FIGS. 1 to 4 schematically show an optical element 50A in accordance with a preferred embodiment of the present invention. As shown in FIG. 1, the optical element 50A comprises red, green and blue fluorescence luminous elements 2 which are formed on a transparent substrate 3 such as a transparent glass plate and optical filters 1 formed over the fluorescence luminous elements 2. The fluorescence luminous elements 2 for red, green and blue are formed by applying red, green and blue fluorescent coating layers, respectively, on the transparent substrate 3. The optical filter 1 comprises a cholesteric layer such as a cholesteric liquid crystal layer operative to reflect scattered fluorescent light. Schematically shown by a reference character L are excitation rays, such as near ultra-violet rays generated by a black light source (not shown) such as a fluorescent lamp and electro luminescence generated by an LED, an FED or a CRT. Similarly, schematically shown by a reference character M are fluorescent rays emanating from the fluorescence luminous coating layers 2. The fluorescence luminous coating layer 2 emits red, green or blue fluorescent rays M when excited. The fluorescent rays M include two parts, namely a part of fluorescent rays 5a that directly come out forward of the fluorescence luminous coating layer 2 and a part of fluorescent rays 5b that are reflected by the cholesteric filter 1 and then travels forward passing through the fluorescence luminous layer 2. There are various optical elements equipped with the cholesteric filter 1, which are different in structure from the optical element 50A. Optical elements of this type are known from, for example, Japanese Unexamined Patent Publication Nos. 7-36025, 10-513578 and 11-24052, and a technical paper entitled "Novel Photoluminescent Cholesteric Display" disclosed on pages 258–261 of IDRC 1997. In particular, the optical display disclosed in the technical paper entitled "Novel Photoluminescent Cholesteric Display" comprises an ultra-violet light source, a cholesteric reflecting element, a cholesteric liquid crystal light modulating element and a fluorescence luminous element arranged in this order. The choresteric reflecting layer used in this display does not has a property of reflecting fluorescent rays from the fluorescence luminous element. In this regard, the prior art optical element is completely different in structure and purpose from the optical element of the present invention.

The cholesteric filter 1 works on the following principle. That is, the cholesteric filter 1 comprises a cholesteric liquid crystal layer that has a molecular orientation parallel to the layer and a spiral molecular structure in the vertical direction with respect to the layer. Letting ne and no be refractivities of the liquid crystal layer for ordinary light and extraordinary light respectively, a double refractivity Δn is given by the following expression (I):

$$\Delta n = ne - no \quad (I)$$

Further, a mean reflexivity n is approximately given by the following expression (II).

$$n = (ne + no)/2 \quad (II)$$

The liquid crystal layer presents a selective reflection property with respect to red, green and blue on the principle of black reflection. Light incident upon the liquid crystal layer at an angle θ [deg] is selectively reflected. The center wavelength of selective reflection λ(θ) [nm] of light incident upon the liquid crystal layer at an angle θ is given by the following expression (III)

$$\lambda(\theta) = \lambda(\theta) \cdot \cos[\sin^{-1}(\sin \theta/n)] \quad (III)$$

where λ(0) is the center wavelength of selective reflection of light vertically incident upon the liquid crystal layer. The center wavelength of selective reflection λ(0) and the wavelength band of selective reflection Δλ [nm] are given by the following expressions (IV) and (V), respectively.

$$\lambda(0) = n \cdot P \quad (IV)$$

$$\Delta \lambda = \Delta n \cdot P \quad (V)$$

where P [nm] is the spiral pitch of the liquid crystal layer.

As apparent from the above, the cholesteric filter 1, i.e. the cholesteric liquid crystal layer, can be provided with a desired center wavelength of selective reflection λ(θ) and a desired wavelength band of selective reflection Δλ by controlling physical properties, i.e. the reflectivites ne and no and spiral pitch P, of the cholesteric liquid crystal layer. More specifically, the control of spiral pitch P can be performed by, for example, regulatingly mixing at least two liquid crystal substances having different spiral pitches.

Figure 2:
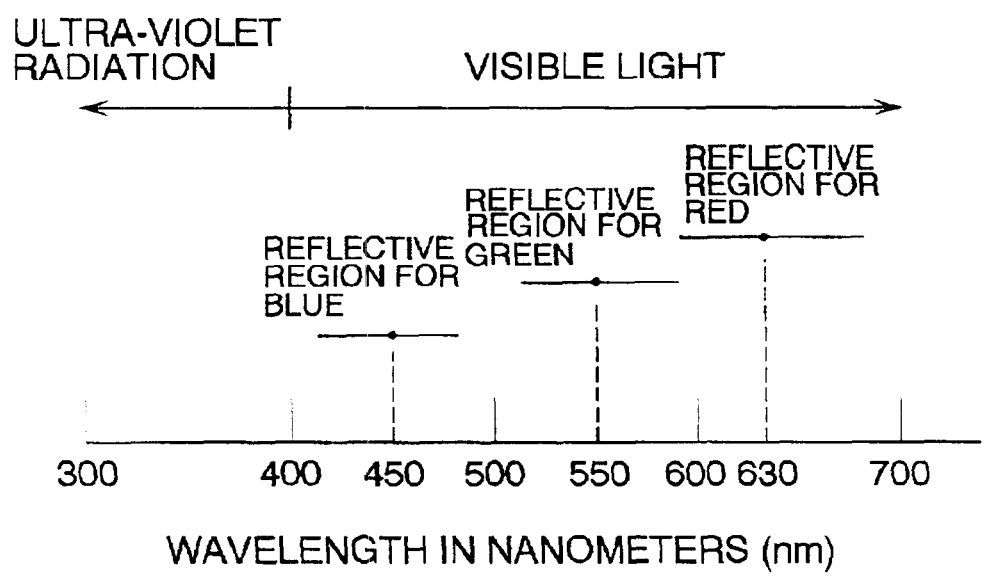
FIG. 2 is a graphical diagram showing an optical characteristic of an optical filter layer of the optical element shown in FIG. 1.

In a trial design of a cholesteric liquid crystal layer as the cholesteric filter operative to transmit ultra-violet light (excitation light) and to reflect visible light (fluorescent light) as an illustrative example in which a liquid crystal substance having a reflectivity ne of 1.7 for ordinary light and a reflectivity no of 1.5 for extraordinary light is used, as apparent from the optical characteristic of the cholesteric filter shown in FIG. 2, it is impossible to establish a wavelength band of selective reflection Δλ over the entire wavelength range of visible spectrum from 400 nm to 700 nm (the band width is 300 nm) on the basis of the expressions (IV) and (V). Therefore, choresteric liquid crystal layers are formed separately for wavelength ranges of three primary colors, namely red (R), green(G) and blue (B).

When the center wavelengths of selective reflection λR(0), λG(0) and λB(0) of red (R), green(G) and blue (B) light incident upon the choresteric liquid crystal layers, respectively, are 630 nm, 550 nm and 450 nm, respectively, the spiral pitches PR, PG and PB of the choresteric liquid crystal layers, that are given by the expression (IV), are 394 nm, 344 nm and 281 nm, respectively.

When the respective choresteric liquid crystal layers are formed so as to have the spiral pitches 394 nm, 344 nm and 281 nm, respectively, the respective wavelength bands of selective reflection ΔλR, ΔλG and ΔλB, that are given by the expression (V), are 79 nm, 69 nm and 56 nm, respectively. These choresteric liquid crystal layers as the cholesteric filters 1 exhibit optical characteristics shown in FIG. 2. That is, the choresteric liquid crystal layers reflect red light in the reflective range of wavelength rage (a center wavelength of selective reflection λ0=630 nm), green light in the reflective range of wavelength (a center wavelength of selective reflection λ0=550 nm) and blue light in the reflective range of wavelength (a center wavelength of selective reflection λ0=450 nm), respectively, and admits light out of the reflective ranges of wavelength such as ultra-violet light.

In this instance, as understood from the expression (III), the center wavelength of selective reflection λ(θ) shifts toward the shorter wavelength side as the incident angle θ with respect to the spiral axis becomes larger. Therefore, the shift in the center wavelength of selective reflection λ(θ) that depends on an incident angle is an inevitable design factor of a system including the cholesteric liquid crystal layer.

Figure 3:
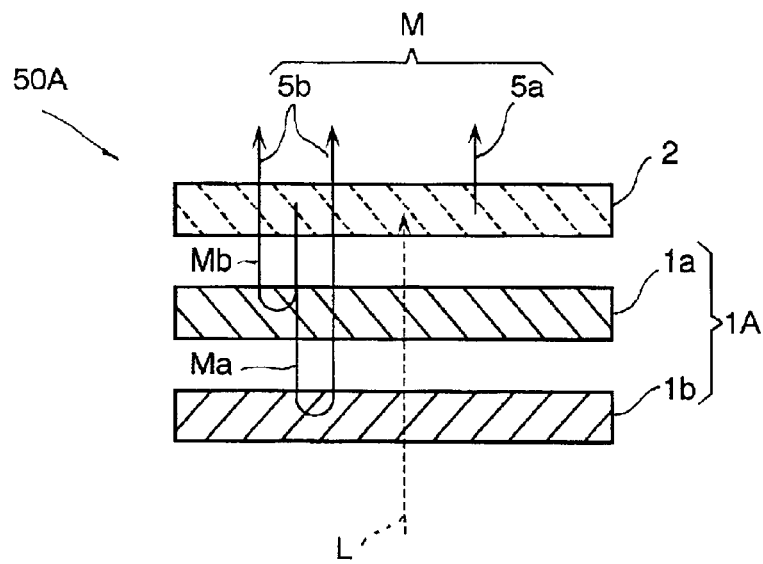
FIG. 3 is a schematic cross-sectional view of another optical filter layer of the optical element shown in FIG. 1 that comprises two cholesteric liquid crystal layers having right- and left-handed spiral structures, respectively.

In the case where the cholesteric liquid crystal layer has a right-handed spiral structure, the cholesteric liquid crystal layer reflects the right-handed circularly polarized component of light and admits the left-hand circularly polarized component of light to pass through. On the other hand, in the case where the cholesteric liquid crystal layer has a left-handed spiral structure, the cholesteric liquid crystal layer reflects the left-handed circularly polarized component of light and admits the right-hand circularly polarized component of light to pass through. Accordingly, as shown in FIG. 3, in order for the cholesteric filter 1A to reflect the right- and left-handed circularly polarized components of light Ma and Mb entirely, the cholesteric filter 1A is formed by double cholesteric liquid crystal layers 1a and 1b having spiral structures opposite in twist direction which are superposed one on top of the other.

Figure 4:
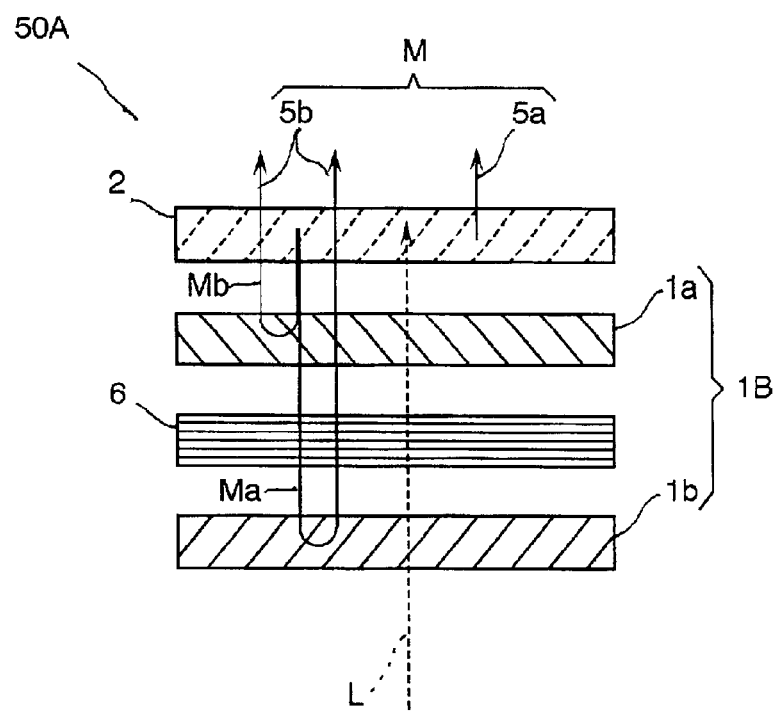
FIG. 4 is a schematic cross-sectional view of another optical filter layer of the optical element shown in FIG. 1 that comprises two cholesteric liquid crystal layers having the same spiral structure.

Further, the cholesteric filter 1 operative to reflect the right- and left-handed circularly polarized components of light entirely can be formed by double cholesteric liquid crystal layers 1a and 1b having spiral structures identical in twist direction. Specifically, as shown in FIG. 4, the cholesteric filter 1B comprises two cholesteric liquid crystal layers 1a and 1b having a right-handed (or a left-handed) spiral structures, respectively, and a half-wave plate element 6 sandwiched between the cholesteric liquid crystal layer 1a and 1b. The half-wave plate element 6 is used to convert a right-handed circularly polarized component of light into a left-handed circularly polarized component of light or vice versa.

These cholesteric liquid crystal layer 1a, 1b, . . . for a selected reflection color can be formed by the process of applying and drying a polyimide orientation coating layer on a transparent substrate and rubbing the polyimide orientation coating layer for surface treatment. The process further includes applying a regulator solution of a mixture of a low-molecular cholesteric liquid crystal or a mixture of a nematic liquid crystal and a chiral agent operative to develop twist, a high-molecular monomer, and a photo-polymarization initiator with an organic solvent over the polyimide orientation coating layer on the transparent substrate and then heating the polyimide orientation coating layer applied with the regulator solution at an appropriate temperature so as to orient the cholesteric liquid crystal. The cholesteric liquid crystal layer 1a, 1b, . . . thus formed is exposed to ultra-violet rays for photo-polymerization in a given pattern and is subsequently developed to remove unexposed portion. Finally, the patterned cholesteric liquid crystal layer is baked at a high temperature for stabilization.

For controlling the twist direction of spiral structure and reflection color of the cholesteric liquid crystal layer, an appropriate combination of a cholesteric liquid crystal and a chiral agent and their densities are chosen. In order to arrange cholesteric liquid crystal layers for the remaining reflection colors, the same process is repeated by using regulator solutions for developing the remaining colors, respectively.

In the case where the cholesteric liquid crystal layer is formed by a high molecular cholesteric liquid crystal, after applying and drying a polyimide orientation coating layer on a transparent substrate and then rubbing the polyimide orientation coating layer for surface treatment in the same manner as described above, a regulator solution of a mixture of a high molecular cholesteric liquid crystal and a photo-polymerization initiator with an organic solvent is applied over the polyimide orientation coating layer. Then, the cholesteric liquid crystal layer on the transparent substrate is heated at an appropriate temperature so as to orient the cholesteric liquid crystal. The cholesteric liquid crystal layer thus formed on the transparent substrate is exposed to ultra-violet rays for photo-polymerization in a given pattern and developed to remove unexposed portion. The reflection color (spiral pitch) of the cholesteric liquid crystal layer can be controlled by a temperature at which the cholesteric liquid crystal layer is heated for orientation. The cholesteric liquid crystal layer is stabilized due to the photo-polymerization. In order to arrange colestric liquid crystal layers for the remaining colors, cholesteric liquid crystal layers are heated at different orientation temperatures, respectively, and exposed to ultra-violet rays in given patterns, respectively.

It is possible to arrange colesteric liquid crystal layer as the cholesteric filters 1 for three primary colors by controlling exposure of light to a single cholesteric liquid crystal layer. For instance, a mixture of a low-molecular cholesteric liquid crystal or a high-molecular cholesteric liquid crystal is mixed with a photoreactive (photo-isomeric) chiral agent. The cholesteric liquid crystal changes its spiral pitch depending upon the amount of exposure light having a wavelength to which the photoreactive chiral agent reacts such as near ultra-violet light. Therefore, by selectively exposing the colesteric liquid crystal layer to different amounts of near ultra-violet light the cholesteric liquid crystal layer is formed in a desired pattern of red, green and blue reflective layer arrangement. The cholesteric liquid crystal layer after patterned exposure is subjected to a thermal hardening treatment or a photo-polymerization treatment for stabilization.

The half-wave plate element 6 can be prepared by using, for example, a uniaxial oriented high-molecular film or a biaxial oriented high-molecular film that is made of a uniaxial optical medium having a high and uniform transmittance. High-molecular films available for the half-wave plate element include polycarbonate, polyester, polyvinyl-alcohol and the like.

Figure 5:
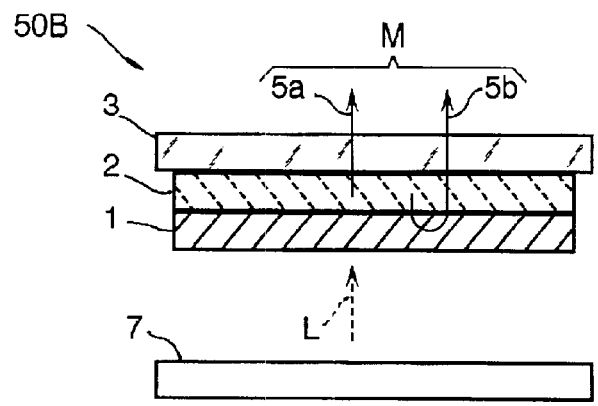
FIG. 5 is a schematic cross-sectional view of an optical element with an excitation light source in accordance with another preferred embodiment of the present invention.

FIG. 5 shows a alight source unit which comprises an optical element 50B in accordance with another embodiment of the present invention and an ultra-violet source. The optical element 50B comprises a fluorescence luminous element 2 which is formed on a transparent substrate 3 such as a transparent glass plate, a cholesteric filter 1 formed over the fluorescence luminous elements 2. The optical element 50B is united with an ultra-violet flat source 7 (only schematically shown) such as a fluorescent lamp (black light lamp) that emits ultra-violet light. The optical element 50B is just the same in structure and operation as the optical element 50A shown in FIG. 1, except the ultra-violet flat source 7. The fluorescent lamp comprises a low pressure mercury lamp with the inner surface applied with a fluorescent coating. An LED, a laser or an EL is available for the fluorescent lamp. The cholesteric filter 1 is formed as a multi-layer reflective coating comprising three cholesteric liquid crystal layers which reflect red, green and blue fluorescent light, respectively.

The same is true for the cholesteric filter 1 comprising a cholesteric liquid crystal layer in connection with the action to transmit ultra-violet rays L and reflect fluorescent rays 5b, the center wavelengths of selective reflection $\lambda R(0)$, $\lambda G(0)$ and $\lambda B(0)$ for colors R, G and B, the spiral pitches PR, PG and PB for the wavelength ranges of selective reflection for the respective colors and the like.

The light source unit thus structured provides bright fluorescent illumination and has a wide variety of applications.

Figure 6:
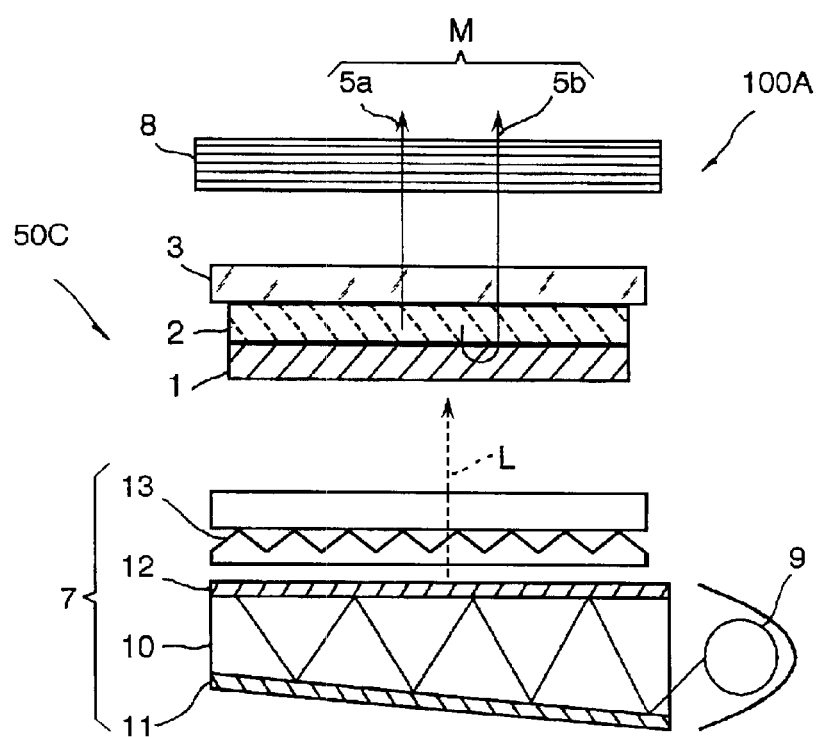
FIG. 6 is a cross-sectional view of an optical display device in accordance with another preferred embodiment of the present invention.

FIG. 6 shows an optical display device 100A in accordance with a preferred embodiment of the present invention. The optical display device 100A includes a light modulating element such as an LCD in combination with an optical element similar to that shown in FIG. 5. Specifically, the optical display device 100A comprises an optical element 50C, which is similar in operation to the optical element 50B shown in FIG. 5. The optical element 50C comprises a fluorescence luminous element 2 and a cholesteric filter 1 formed in this order on a transparent substrate 3 such as a transparent glass plate, and an ultra-violet flat source unit 7. The optical element 50C is just the same in structure and operation as the optical element 50B, except that the flat source unit 7 is employed in place of the ultra-violet flat source 7. The flat source unit 7 comprises a fluorescent lamp 9, a light guide plate 10 tightly sandwiched between a reflecting plate 11 and a diffusing plate 12, and a prism plate 13. The cholesteric filter 1 comprising a cholesteric liquid crystal layer is patterned so as to perform selective reflection for the primary colors, namely red, green and blue light.

The fluorescent lamp 9 is of the same type as employed in the ultra-violet flat source 7 described in connection with the previous embodiment which comprises a low pressure mercury lamp with the inner surface applied with a fluorescent coating. The light guide plate 10 is made of, for example, acrylic or polycarbonate that has a high reflectivity Ultra-violet rays emanating from the fluorescent lamp 9 enter the light guide plate 10 and then travels in the light guide plate 10 repeating total reflection between interfaces with the reflecting plate 11 and the diffusing plate 12. Then the ultra-violet rays are diffused by the diffusing plate 12 and come out of the light guide plate 10 in a direction perpendicular to the diffusion plate 12. The close contact of the diffusion plate 12 to the light guide plate 10 causes the diffused ultra-violet rays to efficiently come out of the light guide plate 10.

The diffused ultra-violet rays are collimated and polarized by the prism plate 13. As a result, the ultra-violet rays are extracted as excitation rays L containing predominantly a vertical component and are directed forward almost vertically with respect to the prism plate 13. This results in that the ultra-violet excitation rays L enter the cholesteric filter 1 at an incident angle of approximately zero, which is accompanied by an effect of preventing or significantly reducing an influence of an incident angle on the shift in the center wavelength of selective reflection.

The ultra-violet excitation rays L passes through the cholesteric filter 1 and then excite the fluorescence luminous element 2 so that the fluorescence luminous element 2 emits fluorescent light M, partly forward as direct fluorescent rays 5a and partly backward as scattered light. The scattered light is reflected by the cholesteric filter 1 as reflected fluorescent rays 5b and passes through the fluorescence luminous element 2 and the transparent substrate 3. These direct and reflected fluorescent rays 5a and 5b are integrate with each other as display fluorescent rays M.

By forming the cholesteric filter 1 by superposing two cholesteric liquid crystal layers 1a and 1b having spiral structures opposite in twist direction as shown in FIG. 3 or 4, the cholesteric filter 1 can reflect both right- and left-hand circularly polarized components of light. Accordingly, the entire energy of the ultra-violet excitation rays L is converted into fluorescent rays M by color. The color fluorescent rays M are modulated by the light modulating element 8 such as an LCD, so that the optical display device makes a clear and bright display.

Figure 7:
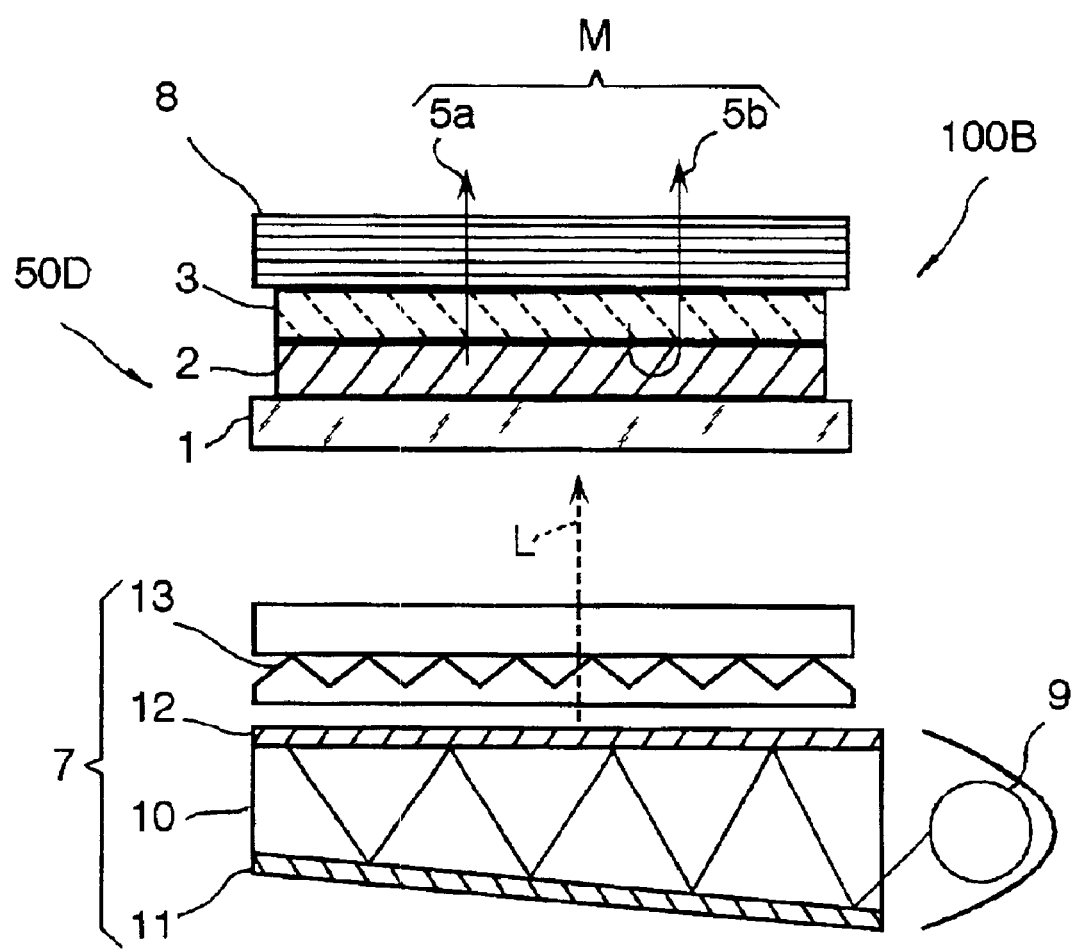
FIG. 7 is a cross-sectional view of a variant of the optical display device shown in FIG. 6 in which a transparent substrate is put in different position.

FIG. 7 shows an optical display device 100B which is similar to that shown in FIG. 6 but employs an optical element having a practically realistic structure. Specifically, the optical display device 100B comprises an optical element 50D including a flat source unit 7 united with a light modulating element 8. The optical element 50D comprises a cholesteric filter 1 and a fluorescence luminous element 2 sandwiched between a transparent substrate 3 facing the light source unit 7, more particularly, a prism plate 13 of the flat source unit 7, and a light modulating element 8. Details of the structure and operation of the optical display device 100B are similar to those of the optical display device 100A shown in FIG. 6, except that the transparent substrate 3 is disposed between the prism plate 13 of the flat source unit 7 and the cholesteric filter 1.

Figure 8:
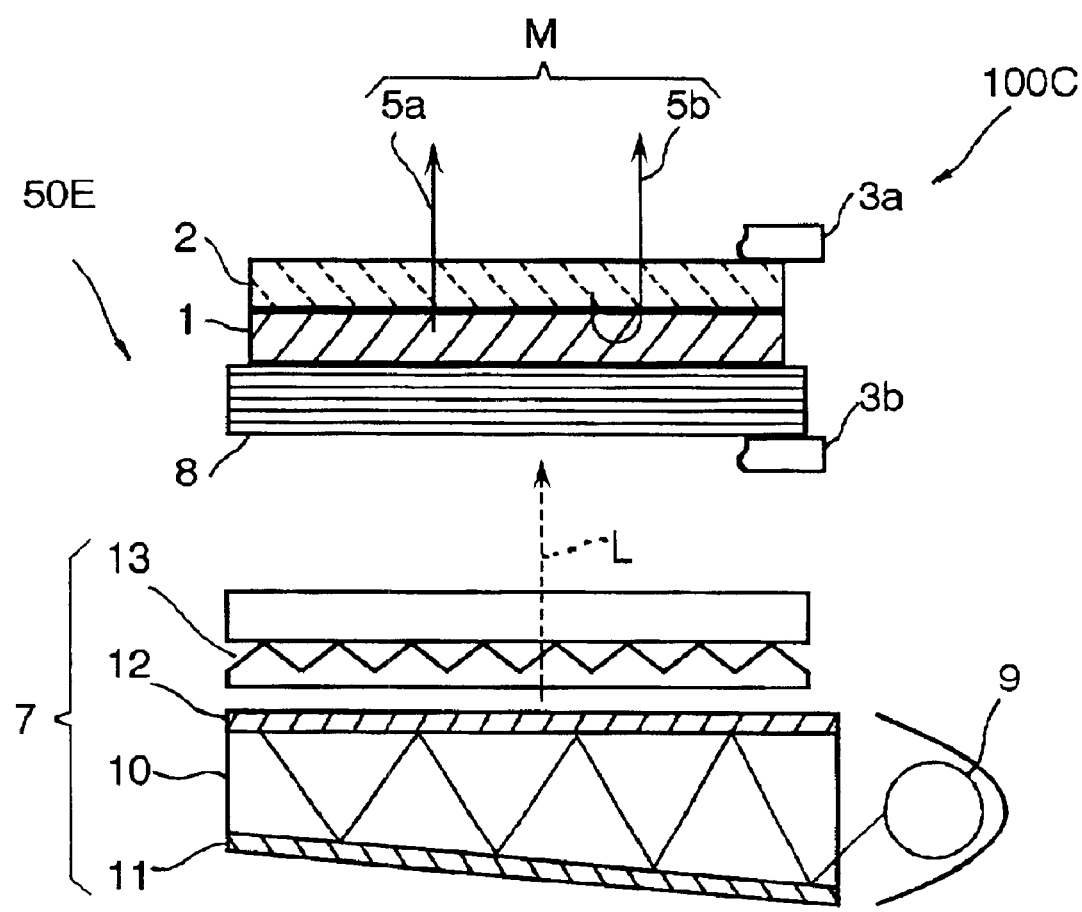
FIG. 8 is a cross-sectional view of the optical display device shown in FIG. 6 in which another optical element is incorporated.

FIG. 8 shows an optical display device 100C in which an optical element different in structure from that shown in FIG. 6 or 7 is employed. Specifically, the optical display device 100C comprises an optical element 50E including an ultra-violet flat source unit 7, and a light modulating element 8. The optical element 50E comprises a cholesteric filter 1 and a fluorescence luminous element 2 and a light modulating element 8 formed in this order on a transparent substrate (not shown).

In the optical display device 100C, ultra-violet excitation rays L are modulated first and, thereafter, pass through the cholesteric filter 1 to excite the fluorescence luminous element 2. Other details of the structure and operation of the optical display device are the same as those of the optical display device 100A shown in FIG. 6 or those of the optical display device 100B shown in FIG. 7, except that the transparent substrate 3 is replaced with the light modulating element 8.

This unique structure of the optical element 100C causes excitation of the fluorescence luminous element 2 after modulation of the excitation rays L provides scattered fluorescent rays M so that the optical display device 100C has no necessity of a diffusing element in order to make a wide view angle of display. In addition, the cholesteric filter 1 reflects scattered fluorescent rays, so that the optical display device 100C increases the utilization efficiency of excitation rays L. This results in making a bright display.

The light modulating element 8 may be provided in various forms well known in the art as described by way of examples below.

Figure 9:
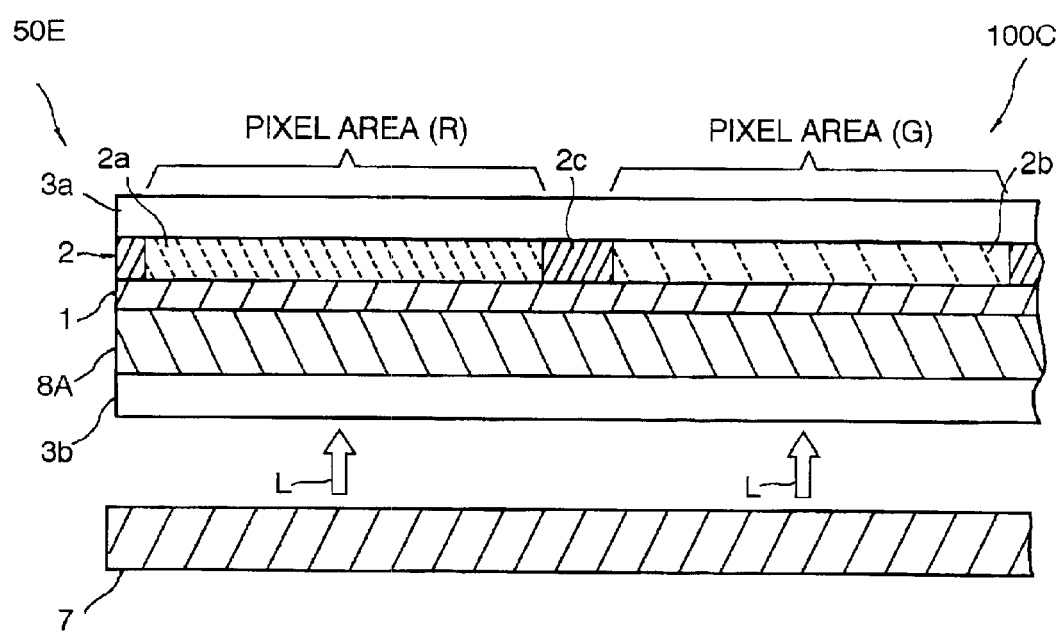
FIG. 9 is a cross-sectional view of an optical display device in accordance with another preferred embodiment of the present invention in which a liquid crystal light modulating element is incorporated.

FIG. 9 schematically shows the optical display device 100C in which a liquid crystal layer is employed for the light modulating element 8 as an integral part of the optical element 50E such as shown in FIG. 8. The optical display device 100C comprises an ultra-violet flat source 7 (only schematically shown) which emits ultra-violet rays and an optical element 50E. The optical element 50E comprises a liquid crystal layer 8A as a light modulating element, a cholesteric filter 1 such as a cholesteric liquid crystal layer and a fluorescence luminous element 2, all of which are sandwiched in this order from the back to the front between front and rear transparent substrates 3a and 3b. In this instance, the fluorescence luminous element 2 is divided and separated by a black mask 2b into pixel areas 2a, 2b, . . . , for three primary colors in order to restrain crosstalk between each adjacent pixels and to prevent or significantly reduce a loss of contrast of a display due to reflection of ambient lightays.

The liquid crystal light modulating layer 8A is accompanied by ITO electrodes, an orientation thin film, a liquid crystal and their associated elements (all of which are not shown). Collimated ultra-violet rays extracted as excitation rays L from the flat source 7 enter the integrated optical element 50E at an incident angle of approximately zero. A driving voltage is exerted on and shut off from the liquid crystal light modulating layer 8A so as to transmit and block the excitation rays L for modulation. The excitation rays L pass through the cholesteric filter 1 and enter the fluorescence luminous elements 2 to excite them. As a result, red, green and blue fluorescent rays come out of the optical display device 100C to make a color display. The fluorescent rays partly scattering backward from the fluorescence luminous elements 2 are reflected back by the cholesteric filter 1 and come out of the fluorescence luminous elements 2. The fluorescent rays coming out after reflection by the cholesteric filter 1 are united with the fluorescent rays coming directly out of the fluorescence luminous elements 2. This increases the utilization efficiency of excitation rays and, in consequence, provides an effect of making a bright display.

The liquid crystal layer employed for the light modulating element 8 is typically made of a nematic liquid crystal. The nematic liquid crystal layer is driven by TFT active matrix drive. In the case of making a color display, it is necessary for the nematic liquid crystal modulating layer to be capable of varying in multiple steps in level, in other words, to exhibit gradations of half tone. The fluorescence luminous element 2 may be patterned on the front transparent substrate 3a by a dyeing method, a printing method or a photolithographic method.

As compared with the conventional liquid crystal display devices in which white lightays are modulated by a liquid crystal layer and colored by an absorption pigment type color filter, the optical display device thus configured increases the utilization efficiency of excitation rays and provides an effect of making a bright color display due to modulation of the ultra-violet excitation rays by the liquid crystal layer 8A and coloring conversion of the entire energy of the excitation rays 4 by the fluorescence luminous elements 2 in addition to reflection of backward scattered fluorescent rays by the cholesteric filter 1 and also improves the dependence of display on an angle of view because diffused fluorescent rays emanating from the fluorescence luminous element 2.

The cholesteric filter 1 comprising a multi-layer reflective coating may be replaced by a single-layer reflective coating patterned in conformity with the patterned fluorescent layer 2.

Figure 10:
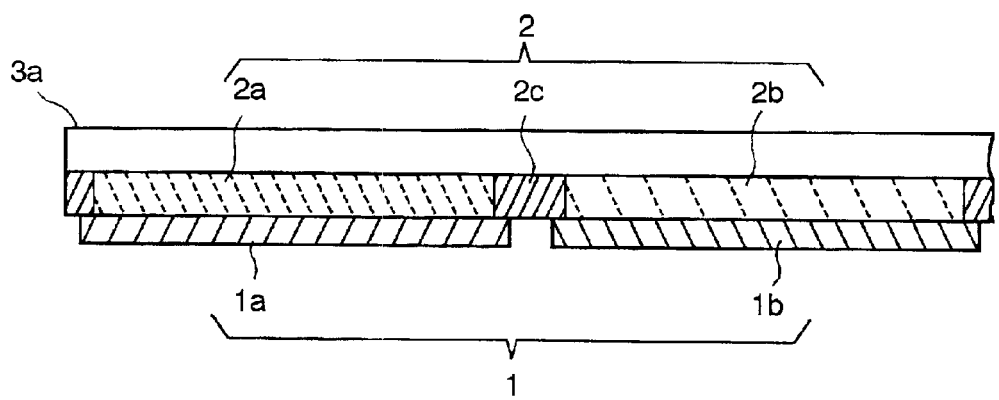
FIG. 10 is a schematic cross-sectional view of an optical filter layer incorporated in the optical display device shown in FIG. 9.

As shown in FIG. 10(11), a cholesteric filter 1 is patterned and divided into separate pixel areas 1a, 1b, . . . in conformity with the pixel areas 2a, 2b, . . . of the fluorescence luminous element 2 so as to selectively reflect red, green and blue fluorescent rays by the separate pixel areas, respectively. This patterned cholesteric filter 1 is provided by selectively heating a single layer of an appropriately regulated cholesteric liquid crystal at different orientation temperatures. This mono-color cholesteric filter is simple and inexpensive in fabrication as compared with the multi-layer filter.

Besides the nematic liquid crystal layer, the light modulating element 8 may be prepared by using an electromechanical light modulating element operative to modulate excitation rays with an electromechanical action (a horizontal displacement of a flexible thin film lattice due to electrostatic force).

Figure 11:
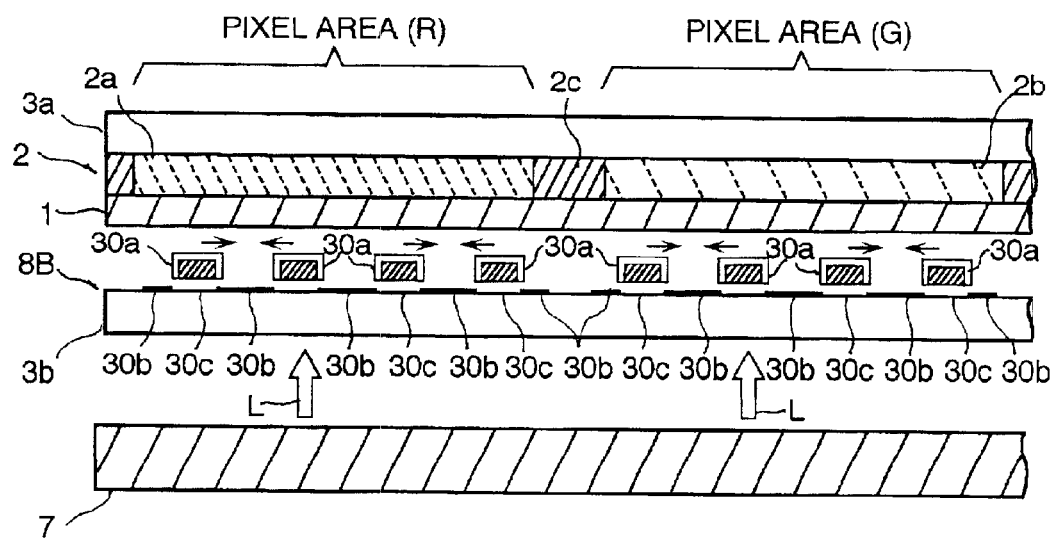
FIG. 11 is a cross-sectional view of a variant of the optical display device shown in FIG. 9 in which an electromechanical light modulating element is incorporated.

FIG. 11(10) shows an optical display device 100D which is similar to the optical display device shown in FIG. 9 but in which the liquid crystal modulating layer 8A is replaced with an array of electromechanical light modulating elements 8B operative as a light modulating element to modulate excitation rays with an electromechanical action. Specifically, the optical display device 100D comprises an ultra-violet flat source 7 (only schematically shown) which emits ultra-violet rays and an optical element 50E. The optical element 50E comprises an electromechanical light modulating element array 8B as a light modulating element, a cholesteric filter 1 such as a cholesteric liquid crystal layer and a fluorescence luminous element 2, all of which are sandwiched in this order from the back to the front between front and rear transparent substrates 3a and 3b. In this instance, the fluorescence luminous element 2 is divided and separated by a black mask 2b into pixel areas 2a, 2b, . . . , for three primary colors in order to restrain crosstalk between each adjacent pixels and to prevent or significantly reduce a loss of contrast of a display due to reflection of ambient light.

The electromechanical light modulating element array 8B has a parallel arrangement of light blocking conductive film strips 30b formed on the rear transparent substrate 3b and light blocking movable elements 30a, one between each adjacent light blocking conductive film strips 30b. The parallel arrangement of light blocking conductive film strips 30b provides an apertures 30c between each adjacent light blocking conductive film strips 30b. The light blocking movable element 30a moves horizontally due to electrostatic stress (attractive or repulsive) that is generated between driving electrodes (not shown) of the light blocking conductive film strip 30b. When a driving voltage is applied between the driving electrodes, the light blocking movable elements 30a move in one direction so as to block the apertures 30c, respectively, so as to prevent excitation rays L from passing through the rear transparent substrate 3b. On the other hand, when the driving voltage is removed from the driving electrodes, the light blocking movable elements 30a move in another direction so as to unblock the apertures 30c, respectively, so as to permit the excitation rays L to pass through the rear transparent substrate 3b at the apertures 3c. In this manner, the electromechanical light modulating element array 8B modulates the excitation rays L due to the reciprocal horizontal displacement of the light blocking movable elements 30a.

Figure 12:
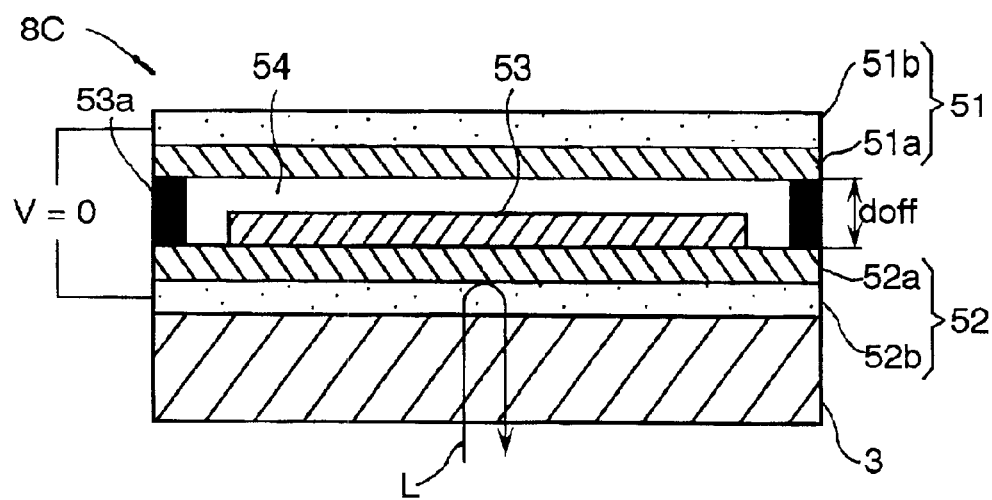
FIG. 12 is a schematic cross-sectional view of another type of electromechanical light modulating element operative to perform light modulation by controlling optical length of interference so as to change transmittance in which the electromechanical light modulating element is in an excitation light blocking state.
Figure 13:
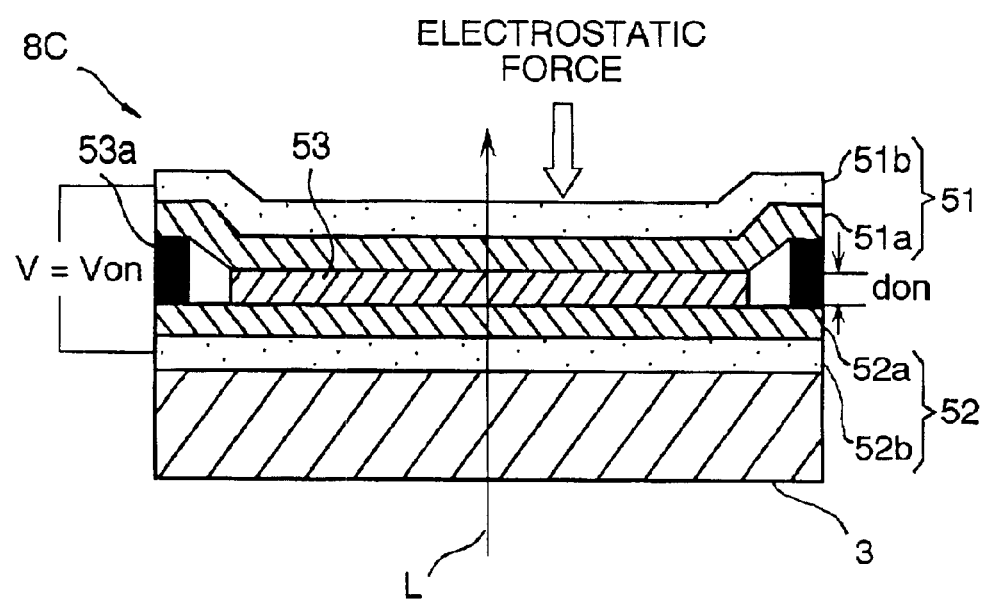
FIG. 13 is a schematic cross-sectional view of the electromechanical light modulating element shown in FIG. 12 in which the electromechanical light modulating element is in an excitation light transmitting state.

Further, as shown by way of example in FIGS. 12 and 13, the electromechanical light modulating element may be of a type operative to modulate exciting rays due to a change in transmittance that is caused by changing an optical length of interference. The electromechanical light modulating element 8C, which is disposed on a transparent substrate 3 such as a transparent glass plate, comprises a pair of half mirrors disposed with a predetermined separation in an axial direction, namely a flexible front mirror-electrode element 51 and a fixed rear mirror-electrode element 52. The flexible front mirror-electrode element 51 comprises a flexible half mirror 51a made of an ultra-thin film of metal or a multi-layer film of dielectric substances and a transparent layer of electrode 51b layered over the flexible half mirror 51a The fixed rear mirror-electrode element 52 comprises a transparent layer of electrode 52b fixedly formed on the transparent substrate 3b and a half mirror 52a made of an ultra-thin film of metal or a multi-layer film of dielectric substances that is layered over the rear transparent electrode 52b. A predetermined thickness of transparent spacer film 53 comprising an insulation film is fixedly disposed on the half mirror 52a of the fixed rear mirror-electrode element 52. The front and rear half mirror 51a and 52a are put so as to face each other and separated by spacers 53a so as to provide a predetermined thickness of air-gap 54 over the transparent spacer 53. Each of the front and rear half mirrors 51a and 52a is preferred to have a reflectivity between approximately 0.80 and approximately 0.95.

The flexible front mirror-electrode element 51 bends toward the fixed rear mirror-electrode element 52 due to electrostatic force acting between the front and rear transparent electrodes 51b and 52b that depends upon a driving voltage V applied between the front and rear transparent electrodes 51b and 52b, so as to change the thickness of the air-gap 54. In this instance, the mirror-electrode element 51 is designed to have a flexibility such as to be brought into contact with the transparent spacer 53 when the applied driving voltage V is equal to or higher than a specified voltage Von. In consequence, the optical length of interference that is equivalent to the distance between the front and rear mirror-electrode elements 51 and 52 changes with a change in the applied driving voltage V between the front and rear transparent electrodes 51b and 52b. Specifically, the optical length of interference changes from an equivalent distance doff equal to a total thickness of the air gap 54 and the transparent spacer film 53 that is provided when the applied driving voltage Vis zero (FIG. 12) to an equivalent distance don equal to the thickness of the transparent spacer film 53 that is provided when the applied driving voltage Vis equal to or higher than the specified voltage Von (FIG. 13)

Figure 14:
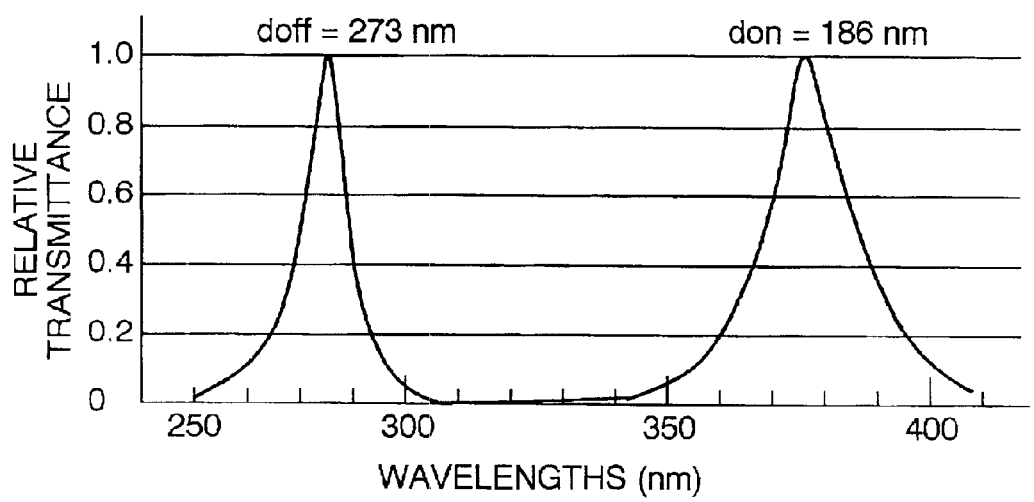
FIG. 14 is a graphical diagram showing spectral transmittance of an electromechanical light modulating element having an optical length of interference of 273 nm in the excitation light blocking state and an optical length of interference of 186 nm in the excitation light transmitting state.
Figure 15:
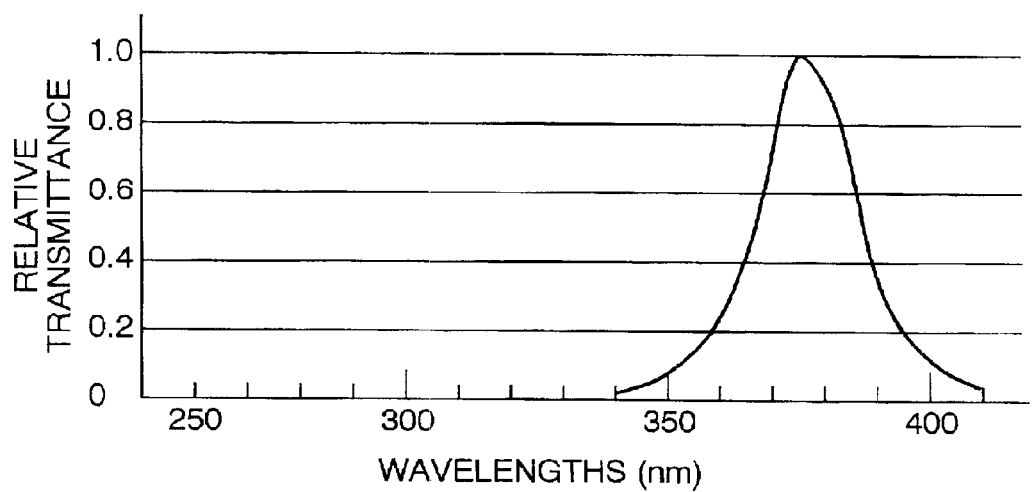
FIG. 15 is a graphical diagram showing a spectral characteristic of near ultra-violet light (black light)

FIG. 14 is a graphical diagram showing relative spectral transmittance of the electromechanical light modulating element 8C in the case where the optical lengths of interference doff and don are 273 nm and 186 nm, respectively. Therefore, as shown in FIG. 14, the electromechanical light modulating element 8C shuts off near ultra-violet excitation rays L when the applied driving voltage V is zero and permits the near ultra-violet rays L to pass through when the applied driving voltage V is equal to or higher than the specified voltage Von.

Figure 16:
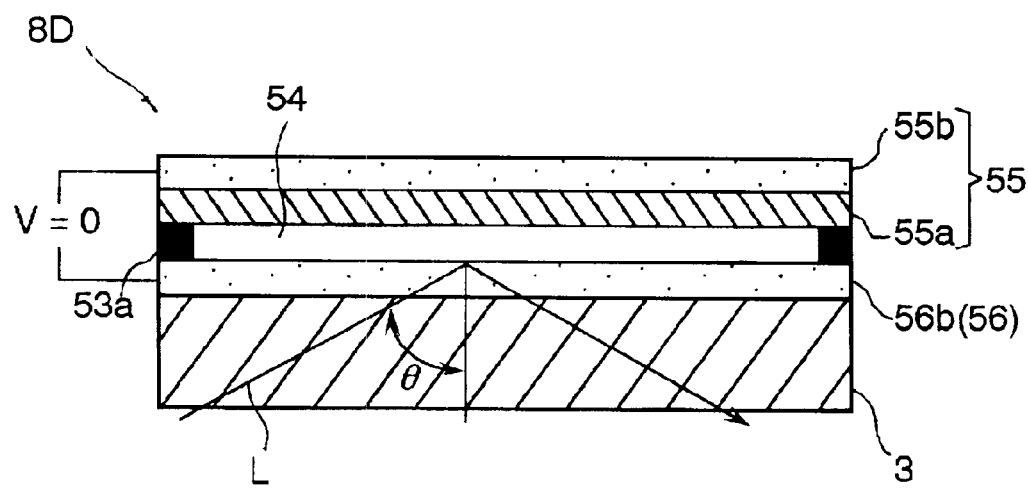
FIG. 16 is a schematic cross-sectional view of another type of electromechanical light modulating element operative to perform light modulation in an excitation light blocking state in which the electromechanical light modulating element performs total reflection of excitation light.
Figure 17:
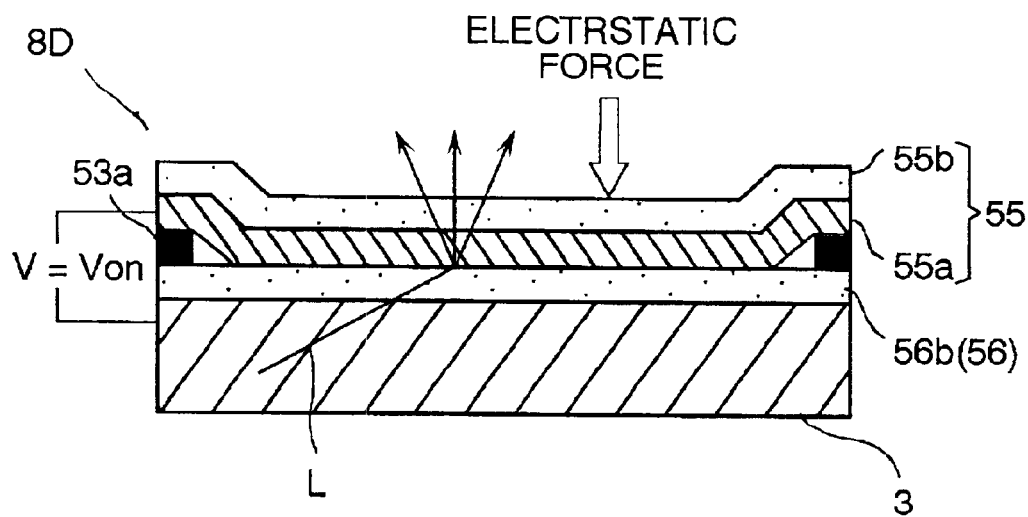
Figure 18:
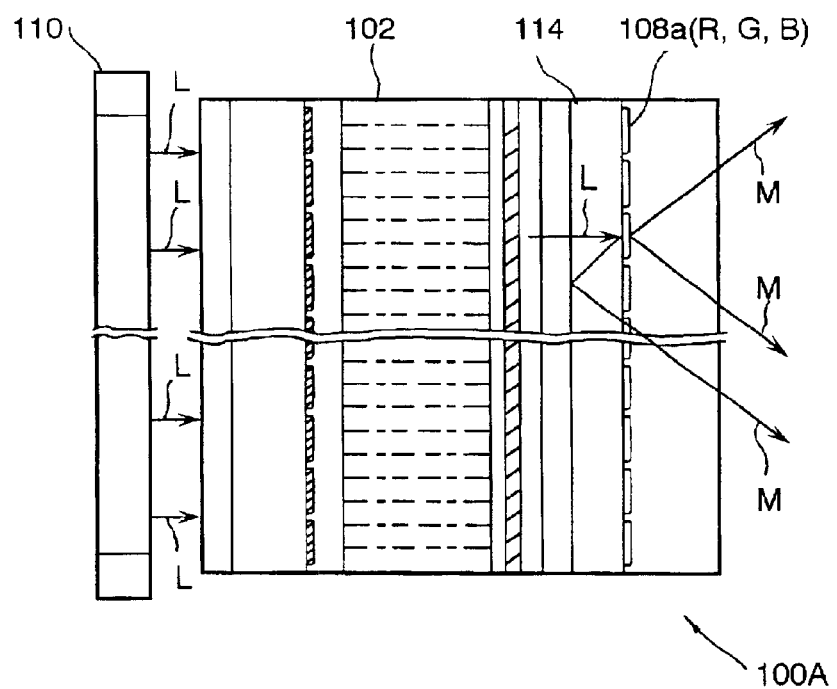
FIG. 18 is a schematic cross-sectional view of a prior art optical display device.
Figure 19:
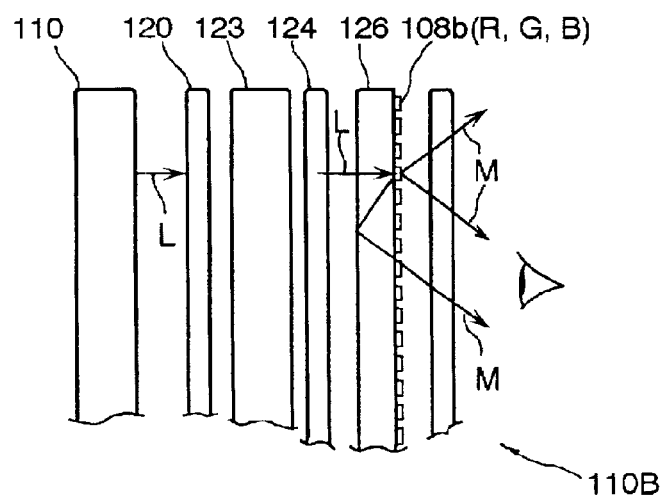
FIG. 19 is a schematic cross-sectional view of another prior art optical display device.

The electromechanical light modulating element may further be modified such as to control transmittance thereof by shutting off excitation rays due to total reflection and permitting proximity excitation rays entering thereto at an incident angle smaller than a critical angle for total reflection as shown by way of example in FIGS. 16 and 17.

As shown in FIGS. 16 and 17, an electromechanical light modulating element 8D comprises a flexible front diffuser-electrode element 55 and a fixed rear electrode element 56. The flexible front diffuser-electrode element 55 comprises a light diffusing layer 55a and a front transparent layer of electrode 55b formed over the a light diffusing layer 55a. The fixed rear electrode element 56 comprising a rear transparent layer of electrode 56b fixedly formed on a transparent substrate 3 such as a transparent glass plate or a light guide element disposed on a transparent glass plate. The flexible front diffuser-electrode element 55 and the fixed rear electrode element 56 are directed such that the light diffusing layer 55a faces the rear transparent electrode 56b and separated by spacers 53a so as to provide a specified thickness of air-gap 54 therebetween.

The flexible front diffuser-electrode element 55 bends toward the fixed rear electrode element 56 due to electrostatic force acting between the front and rear transparent electrodes 55b and 56b that depends upon a driving voltage V applied between front and rear transparent electrodes 55b and 55b. In this instance, the flexible front diffuser-electrode element 55 is designed to have a flexibility such as to be brought into contact with the fixed rear transparent electrode element 56 when the applied driving voltage Vis equal to or higher than a specified voltage Von. In consequence, when there is no driving voltage applied between the front and rear transparent electrodes 55b and 56b, the flexible front diffuser-electrode element 55 remains separated at a distance equal to the predetermined thickness of the air-gap 54 from the fixed rear electrode element 56. On the other hand, when the applied driving voltage Von is kept applied between the front and rear transparent electrodes 55b and 56b, the light diffusing layer 55a remains in contact with the rear transparent electrode 56b due to electrostatic force acting between the front and rear transparent electrodes 55b and 56b.

When near ultra-violet rays L enter as excitation light the transparent substrate 3 at an incident angle θ greater than a critical incident angle θo for total reflection while there is no driving voltage applied between the front and rear transparent electrodes 55b and 56b as shown in FIG. 16, the near ultra-violet rays L are totally reflected back, in other words shut off, by the electromechanical light modulating element 8D. On the other hand, when the applied driving voltage V changed to or greater than the specified voltage Von, the light diffusing layer 55a is deformed and brought into contact with the rear transparent electrode 56b as shown in FIG. 17. As a result, the proximity near ultra-violet rays L incident upon the transparent substrate 3 at the same incident angle θ greater than the critical angle θo are induced into the light diffusing layer 55a of the diffuser-electrode element 44 due to proximity effect. Then the near ultra-violet rays L are diffused forward by the light diffusing layer 55a and travel forward passing through the light diffusing layer 55a and the front transparent electrode 55b. In this manner, the electromechanical light modulating element 8D shuts off the near ultra-violet rays L and permits the proximity near ultra-violet rays L to pass through as excitation light of a fluorescence luminous element (not shown) for modulation. Scattered ultra-violet rays directed to the fluorescence luminous element are reflected back by the cholesteric filter (not shown), so as to increases the utilization efficiency of excitation rays with an effect of making a bright display.

The electromechanical light modulating element in the form of flexible thin film makes the optical element perform high speed modulation even at a low driving voltage due to an electromechanical action of the flexible thin film. This provides the ability of displaying moving objects superior to the liquid crystal light modulating element. The excitation rays after modulation by the electromechanical light modulating element and the color conversion of the entire energy of excitation rays by the fluorescence luminous element that partly come directly out of the fluorescence luminous element and partly come out of the fluorescence luminous element after reflection by the cholesteric filter layer are integrated with each other. This results in an increased utilization efficiency of excitation rays and, as a result makes a bright display. Further, scattered fluorescent rays emanating from the fluorescence luminous element improves the dependence of display on an angle of view. This makes a high grade display.

It is to be understood that although the present invention has been described in detail with respect to the preferred embodiments thereof, various other embodiments and variants may occur to those skilled in the art which are within the scope and spirit of the invention, and such other embodiments and variants are intended to be covered by the following claims.

What is claimed is:

1. An optical element operative to provide fluorescent light which comprises:
    a fluorescence luminous element operative to emit fluorescent light when excited by excitation light; and
    an optical filter comprising a cholesteric layer formed directly over said fluorescence luminous element at a side of said fluorescence luminous element at which said excitation light enters said fluorescence luminous element so as to transmit at least partly said excitation light and to reflect at least partly said fluorescent light traveling to said optical filter.

2. An optical element as defined in claim 1, wherein said optical filter comprises a cholesteric layer having a right handed spiral structure and a cholesteric layer having a left handed spiral structure.

3. An optical element as defined in claim 1, wherein said optical filter comprises a half wave plate element and two cholesteric layers between which said half wave plate element is disposed, both said cholesteric layers having either one of right- and left-handed spiral structures.

4. An optical element as defined in claim 1, wherein said optical filter comprises a plurality of cholesteric layer operative to reflect light having wavelengths different from one another, respectively.

5. An optical element as defined in claim 1, wherein said excitation light is ultra-violet light and said fluorescent light is either one of a visible light and infrared light.

6. An optical element as defined in claim 1, wherein said fluorescent layer is excited by ultra-violet light so as to emit red, green and blue light and said optical filter admits said ultra-violet light to pass through and reflects said red, green and blue light.

7. An optical element as defined in claim 1, wherein said fluorescence luminous element emits at least one of red and green fluorescent light when excited by blue excitation light and said optical filter reflects transmits said blue excitation light and reflects said at least one of said red and green fluorescent light traveling to said optical filter.

8. An optical light source unit for providing illumination, which comprises;
    a light source operative to emit excitation light; and
    an optical element united with said light source and operative to provide fluorescent light which comprises:
        a fluorescence luminous element operative to emit fluorescent light when excited by said excitation light; and
        an optical filter comprising a cholesteric layer formed directly over said fluorescence luminous element at a side of said fluorescence luminous element at which said excitation light enters said fluorescence luminous element so as to transmit at least partly said excitation light and to reflect at least partly said fluorescent light traveling to said optical filter,
    wherein said optical filter is arranged so that said optical element admit said fluorescent light or both of said fluorescent light and at least part of said excitation light to come out thereof at a side of said fluorescent luminous element.

9. An optical light source unit as defined in claim 8, wherein said light source comprises at least one of a discharge lamp, an electroluminescent element and an electron-ray radiating element.

10. An optical display device for making a display which comprises:
    an excitation light source operative to emit excitation light;
    an optical element comprising a fluorescence luminous element operative to emit fluorescent light when excited by said excitation light and an optical filter disposed directly over a side of said fluorescence luminous element at which said excitation light enters said fluorescence luminous element; and
    an light modulating element operative to modulate said fluorescent light emanating from said fluorescence luminous element;
    wherein said optical filter comprises a cholesteric layer so as to transmit at least partly said excitation light and to reflect at least partly said fluorescent light; and is arranged so that said optical element admit said fluorescent light or both of said fluorescent light and at least part of said excitation light to come out thereof at a side of said fluorescent luminous element.

11. An optical display device as defined in claim 10, wherein said light source comprises at least one of a discharge lamp, an electroluminescent element and an electron-ray radiating element.

12. An optical display device as defined in claim 10, wherein said light modulating means comprises one selected from a group of liquid crystal element, electromechanical light modulating element operative to modulate light due to electromechanical action and electro-optical crystal.

13. An optical display device as defined in claim 12, wherein said electromechanical light modulating element is of a type which changes a transmissible area that transmits light so as to control transmittance thereof.

14. An optical display device as defined in claim 12, wherein said electromechanical light modulating element is of a type which changes an optical length of interference so as to control transmittance thereof.

15. An optical display device as defined in claim 12, wherein said electromechanical light modulating element is of a type which performs total reflection of light rays incident thereupon and admits proximity light rays so as thereby to control transmittance thereof.

16. An optical display device for making a display which comprises:
    an excitation light source operative to emit excitation light;
    an optical element comprising a fluorescence luminous element operative to emit fluorescent light when excited by said excitation light and an optical filter disposed directly over a side of said fluorescence luminous element at which said excitation light enters said fluorescence luminous element; and
    an light modulating element disposed between said excitation light source and said optical element so as to modulate said excitation light from said excitation light source;

wherein said optical filter comprises a cholesteric layer so as to transmit said excitation light and to reflect at least partly said fluorescent light.

17. An optical display device as defined in claim 16, wherein said light source comprises at least one of a discharge lamp, an electroluminescent element, and an electron-ray radiating element.

18. An optical display device as defined in claim 16, wherein said light modulating means comprises one selected from a group of liquid crystal element, electromechanical light modulating element operative to modulate light due to electromechanical action and electro-optical crystal.

19. An optical display device as defined in claim 18, wherein said electromechanical light modulating element is of a type which changes a transmissible area that transmits light so as to control transmittance thereof.

20. An optical display device as defined in claim 18, wherein said electromechanical light modulating element is of a type which changes an optical length for interference so as to control transmittance thereof.

21. An optical display device as defined in claim 18, wherein said electromechanical light modulating element is of a type which performs total reflection of light incident thereupon and admits proximity light so as thereby to control transmittance thereof.

* * * * *